Aug. 13, 1935.    W. A. SMITH    2,010,933
BUS BAR AND FITTING
Filed April 13, 1934
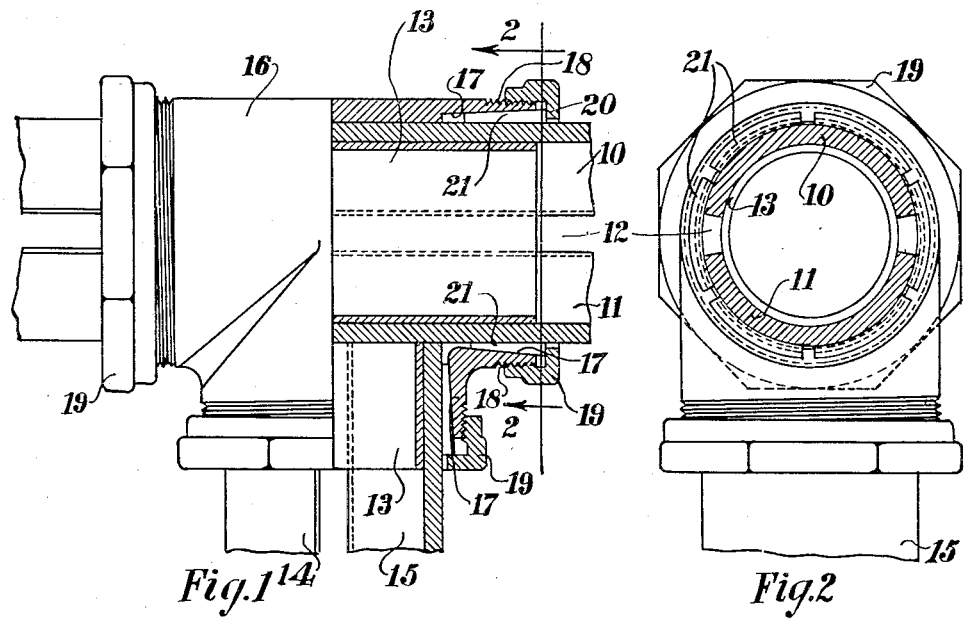
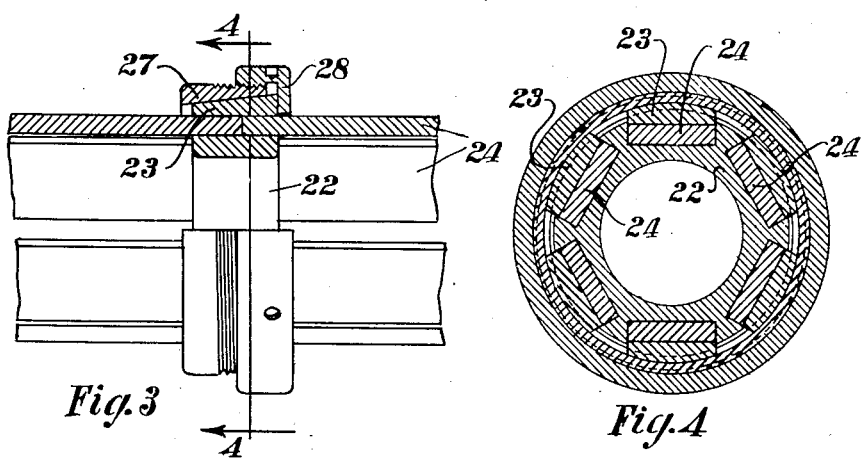
INVENTOR
William A. Smith.
BY Alpheus J. Crane
ATTORNEY Patented Aug. 13, 1935

2,010,933

UNITED STATES PATENT OFFICE 2,010,933

BUS BAR AND FITTING

William A. Smith, Akron, Ohio, assignor to The Ohio Brass Company, Mansfield, Ohio, a corporation of New Jersey Application April 13, 1934, Serial No. 720,394

7 Claims. (Cl. 173—324)

This invention relates to bus bars and bus bar fittings and has for one of its objects the provision of bus bar installations which shall be economical to manufacture and install and in which the material may be worked efficiently.

A further object of the invention is to provide a bus bar which shall be tubular in general formation and in which provision is made for ventilating the conductor parts.

A further object of the invention is to provide bus bar fittings for supporting a plurality of separate bars in tubular formation with the edges of the bars spaced from one another for ventilation.

A further object is to provide a device of the class described which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is an elevation with parts in section of a bus bar and fitting showing one portion of the present invention.

Fig. 2 is a section on line 2—2 of Fig. 1.

Fig. 3 is an elevation with parts in section showing another portion of the present invention.

Fig. 4 is a section on line 4—4 of Fig. 3.

The heavy current conductors or bus bars used in power plants and sub-stations must not only carry efficiently the heavy currents transmitted by them, but must also withstand variations in temperature and heavy mechanical stresses imposed by the magnetic forces set up by the currents. The heating effect of the currents carried by the bars generally necessitates ventilation to prevent overheating of the bars. The conductors must also be capable of connection to branches so as to provide good electrical contact and effective mechanical union. These and other results are obtained by the form of conductors and fittings forming the subject matter of the present invention.

Referring more particularly to the drawings, the main conductor shown in Figs. 1 and 2 is formed of two bars 10 and 11 which are arcuate in cross section but which have their edges spaced apart, as indicated at 12. The arcuate bar sections may be economically manufactured from flat plates by rolling or other manufacturing process so that the construction forms a tubular member having ventilating slots 12. The bars are held in place by spacer rings or sleeves 13 and by encircling clamps which hold the bars 10 against the spacer sleeves.

The fitting shown in Figs. 1 and 2 is a T fitting for connecting a branch bar comprising sections 14 and 15 to the main bar made up of sections 10 and 11. The fitting comprises a T member 16 shaped like a pipe T but having inside tapered portions 17 at the ends of the arms of the fitting. The threads 18 are preferably straight threads instead of being tapered as in the case of a pipe fitting, and are fitted with caps 19 having inwardly projecting flanges 20 for engaging the ends of wedge members 21. The wedge members 21 have their inner faces shaped to fit the contour of the bars 10 and their outer faces shaped to fit the tapered openings 17. It will be seen that when the caps 20 are tightened against the ends of the wedge members, the wedge members will press the bars 10, 11, 14 and 15 tightly against the spacer collars 13, thus insuring good electrical connection of the bars 10, 11, 14 and 15, not only with the collars 13, but through the wedge members 21 with the T fitting 16. The fitting is one which is readily applied and which forms effective electrical connection between the bar sections and which holds the bars themselves in tubular formation, but with their edges spaced to insure proper ventilation. The tubular formation of the conductors is desirable for efficient utilization of the material of the conductors for the transmission of current. It will be apparent that the number of bars 10 and 11 may be varied as desired.

In Figs. 3 and 4 a conductor made up of six bars is illustrated and the bars, instead of being curved, are shown as being rectangular in cross section. Figs. 3 and 4 illustrate a spacer member for the conductor bars which may be applied at any point along the conductor for holding the bars in position. This fitting may also be used for splicing one or more of the conductor bars as shown in Fig. 3. It will be readily apparent that the form of connection there shown can be used with other fittings, such as the T fitting shown in Figs. 1 and 2. In Figs. 3 and 4 the bars 24 are arranged about a spacer ring 22 which is provided with seats or notches shaped to fit the cross sectional contours of the bars 24. Wedges 23 engage the outer faces of the bars 24 and, in turn, have their outer faces arcuate in shape to engage the interior surface of a retainer ring 27. The inner surface of the ring 27 and the outer surfaces of the wedges 23 are tapered, similar to the arrangement shown in Figs. 1 and 2. The ring 27, as previously stated, might be a portion of different forms of fittings, such as T's, L's or other shapes. The cap 28 is similar in construction and function to the caps 19 in Figs. 1 and 2.

Various modifications of the bars and fittings will readily suggest themselves to those skilled in the art, so that I do not wish to be restricted to the particular embodiment shown except as indicated in the appended claims.

I claim:

1. A heavy current conductor comprising a plurality of conductor bars arranged edge to edge in tubular formation but spaced apart to provide ventilation, a spacer sleeve disposed inside of said conductor and engaging the inner faces of said bars, a retainer ring surrounding said bars and wedges between the outer faces of said bars and said retainer ring for clamping said bars against said spacer.

2. A heavy current conductor comprising a plurality of conductor bars arranged edge to edge in tubular formation but spaced apart to provide ventilating slots, a spacer disposed within said conductor and engaging the inner faces of said bars, wedging members engaging the outer faces of said bars, a retainer ring encircling said wedging members, and threaded means for operating said wedging members for pressing said bars against said spacer.

3. A heavy current conductor comprising a plurality of conductor bars arranged edge to edge in tubular formation but spaced apart to provide ventilating slots, a spacer inside said conductor and engaging the inner faces of said bars, wedging members engaging the outer faces of said bars, a retainer ring encircling said wedging members and having contact therewith on surfaces inclined to the axis of said conductor, and a cap threaded on said retainer ring and engaging said wedging members for operating said wedging members to clamp said bars against said spacer.

4. Means for connecting bus conductors comprising a fitting having main coaxial openings at opposite ends thereof and a branch opening having its axis at an angle to the axis of the main openings, tubular bus conductors extending into said openings, spacing rings disposed within said respective bus conductors, said bus conductors having longitudinal slots therein to permit radial compression thereof, and wedging means cooperating with said fitting for pressing said bus conductors against said spacer rings.

5. In combination a main conductor and a branch conductor disposed at an angle thereto, each conductor comprising a plurality of conductor bars arranged in tubular formation, and a fitting for connecting said conductors, said fitting having branch portions disposed at an angle to each other and engaging said respective conductors, each branch portion of said fitting comprising a retainer ring portion integral with the fitting and encircling the conductor associated therewith, a spacer disposed in each of said conductors, and wedging means cooperating with said respective branches of the fitting and disposed between the outer surface of the conductor and the inner surface of the cooperating retainer ring portion for clamping the conductor bars against the respective spacers.

6. The combination with a conductor formed of a plurality of bars disposed in tubular arrangement, of a fitting for splicing one or more of said bars, said fitting comprising a spacer ring disposed inside of said conductor and having means thereon holding said bars in circumferentially spaced relation to one another, the adjacent ends of a spliced bar each engaging said ring, and means for clamping said bars to said ring.

7. A conductor comprising a plurality of bars arranged in tubular formation but spaced apart to provide ventilation, a spacer ring engaging the inner faces of said bars to hold said bars against inward movement, wedges engaging the outer faces of said bars, the outer faces of said wedges lying in a common conical surface, a retainer ring disposed about said wedges in substantial registration with said spacer ring, said retainer ring having its inner surface shaped to conform to the outer surfaces of said wedges, and a tightener nut threaded on said retainer ring and having a flange thereon engaging said wedges and arranged to tighten said wedges between said bars and said retainer ring when said nut is tightened on said retainer ring.

WILLIAM A. SMITH.